United States Patent
Perez et al.

(10) Patent No.: US 11,222,262 B2
(45) Date of Patent: Jan. 11, 2022

(54) NON-MARKOVIAN CONTROL WITH GATED END-TO-END MEMORY POLICY NETWORKS

(71) Applicant: Xerox Corporation, Norwalk, CT (US)

(72) Inventors: Julien Perez, Grenoble (FR); Tomi Silander, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1262 days.

(21) Appl. No.: 15/608,129

(22) Filed: May 30, 2017

(65) Prior Publication Data
US 2018/0348716 A1 Dec. 6, 2018

(51) Int. Cl.
| | |
|---|---|
| *G06N 3/08* | (2006.01) |
| *G05B 13/02* | (2006.01) |
| *G06N 3/04* | (2006.01) |
| *G06N 3/00* | (2006.01) |
| *G06N 7/00* | (2006.01) |
| *G06N 20/00* | (2019.01) |

(52) U.S. Cl.
CPC ............. *G06N 3/08* (2013.01); *G05B 13/027* (2013.01); *G06N 3/006* (2013.01); *G06N 3/0445* (2013.01); *G06N 3/0454* (2013.01); *G06N 7/005* (2013.01); *G06N 20/00* (2019.01)

(58) Field of Classification Search
CPC ........ G06N 3/08; G06N 3/006; G06N 3/0454; G06N 3/0445; G06N 7/005; G06N 20/00; G05B 13/027
USPC .......................................................... 706/15
See application file for complete search history.

(56) References Cited

U.S. PATENT DOCUMENTS

2015/0095033 A1   4/2015  Boies et al.
2015/0178620 A1*  6/2015  Ascari ................... G06N 7/005
                                                           706/21

OTHER PUBLICATIONS

Sukhbaatar et al."End-To-End Memory Networks", arXiv:1503.08895v5 [cs.NE] Nov. 24, 2015 (Year: 2015).*
Bahdanau, et al., "Neural Machine Translation by Jointly Learning to Align and Translate", arXiv:1409.0473v7 [cs.CL] May 19, 2016 (Year: 2016).*
Foerster et al., Learning to Communicate with Deep Multi-Agent Reinforcement Learning, arXiv:1605.06676v2 [cs.AI] May 24, 2016 (Year: 2016).*
U.S. Appl. No. 14/864,076, filed Sep. 25, 2015, Perez, et al.

(Continued)

*Primary Examiner* — Tsu-Chang Lee
(74) *Attorney, Agent, or Firm* — Fay Sharpe, LLP

(57) ABSTRACT

A system and method for predicting a sequence of actions employ a Gated End-to-End Memory Policy Network (GMemN2NP), which includes a sequence of hop(s). Supporting memories of the hops include memory cells generated from observations made at different times. A sequence of actions is predicted, based on input agent-specific variables. For each action, the model, at each hop, outputs an updated controller state which is used as input to the next hop or, for the terminal hop, for computing the respective action. Each hop includes a transform gate mechanism which is used to control the influence of output of the supporting memories on the updated controller state. For the second and subsequent hops, respective actions are predicted, after using any intervening observations to update the supporting memories. The model is learned, on a training set of observations, to optimize the cumulative reward of a sequence of two or more actions.

18 Claims, 4 Drawing Sheets

(56) References Cited

OTHER PUBLICATIONS

U.S. Appl. No. 15/342,590, filed Nov. 3, 2016, Perez, et al.
U.S. Appl. No. 15/350,269, filed Nov. 14, 2016, Perez, et al.
U.S. Appl. No. 15/429,344, filed Feb. 10, 2017, Perez, et al.
U.S. Appl. No. 15/451,860, filed Mar. 7, 2017, Perez, et al.
Aberdeen, "Policy-Gradient Algorithms for Partially Observable Markov Decision Processes," PhD thesis, pp. 1-303 (2003).
Bahdanau, et al., "Neural machine translation by jointly learning to align and translate," arXiv 1409.0473, pp. 1-15 (2014).
Balduzzi, et al., "Compatible value gradients for reinforcement learning of continuous deep policies," arXiv 1509.03005, pp. 1-27 (2015).
Bellemare, et al., "The arcade learning environment: An evaluation platform for general agents," J. Artif. Intell. Res. (JAIR), 47:253-279 (2013).
Brockman, et al., "OpenAI gym," arXiv 1606.01540, pp. 1-4 (2016).
Duan, et al., "Benchmarking deep reinforcement learning for continuous control," Proc. 33rd Int'l Conf. on Machine Learning (ICML) 2016, JMLR Workshop and Conf. Proc., vol. 48, pp. 1329-1338 (2016).
Hausknecht, et al., "Deep recurrent Q-learning for partially observable MDPs," arXiv: 1507.06527, pp. 1-7 (2015).
Heess, et al., "Learning continuous control policies by stochastic value gradients," Adv. in Neural Information Processing Systems (NIPS) 28, pp. 2944-2952 (2015).
Hochreiter, et al., "Long shortterm memory," Neural Computation, vol. 9(8), pp. 1735-1780 (1997).
Kaebling, et al., "Planning and acting in partially observable stochastic domains," Artificial Intelligence, 101 (1-2) pp. 99-134 (1998).
Kempka, et al., "ViZDoom: A doom-based AI research platform for visual reinforcement learning," ArXiv 1605.02097, pp. 1-8 (2016).
Kingma, et al., "Adam: A method for stochastic optimization," arXiv: 1412.6980, pp. 1-13 (Jan. 2017).
Kumar, et al., "Ask me anything: Dynamic memory networks for natural language processing," Proc. 33rd Int'l Conf. on Machine Learning (ICML), JMLR Workshop and Conf. Proc., vol. 48, pp. 1378-1387 (2016).
Lample, et al., "Playing FPS games with deep reinforcement learning," arXiv 1609.05521, pp. 1-7 (2016).
Levin, "Stock selection via nonlinear multi-factor models," pp. 966-972. MIT Press, 1995.
Levine, et al., "End-to-end training of deep visuomotor policies," arXiv 1504.00702, pp. 1-40 (2015).
Meuleau, et al., "Learning finite-state controllers for partially observable environments," Proc.15th Conf. on Uncertainty in Artificial Intelligence (UAI-99), pp. 427-436 (1999).
Mikolov, et al., "Efficient estimation of word representations in vector space," arXiv 1301.3781, pp. 1-12 (2013).
Mnih, et al., "Human-level control through deep reinforcement learning," Nature, vol. 518 (7540) pp. 529-533 (2015).
Mnih, et al., "Asynchronous methods for deep reinforcement learning," Proc. 33rd Int'l Conf. on Machine Learning (ICML), JMLR Workshop and Conf. Proc., vol. 48, pp. 1928-1937 (2016).
Moody, et al., "Reinforcement learning for trading," Adv. in Neural Information Processing Systems, (NIPS), pp. 917-923 (1998).
Neuneier, "Optimal asset allocation using adaptive dynamic programming," Adv. in Neural Information Processing Systems (NIPS), pp. 952-958 (1995).
Neuneier, "Enhancing Q-learning for optimal asset allocation," Adv. in Neural Information Processing Systems (NIPS), pp. 936-942 (1997).
Nevmyvaka, et al., "Reinforcement learning for optimized trade execution," Proc. 23rd Int'l Conf. on Machine Learning (ICML 2006), ACM Int'l Conf. Proc. Series, vol. 148, pp. 673-680 (2006).
Pennington, et al., "Glove: Global vectors for word representation," Proc. Conf. on Empirical Methods in Natural Language Processing (EMNLP 2014), A meeting of SIGDAT, a Special Interest Group of the ACL, pp. 1532-1543 (2014).
Perez, et al., "Gated end-to-end memory networks," arXiv 1610.04211, pp. 1-10 (2016).
Peters, et al., "Policy gradient methods for robotics," IEEE/RSJ Int'l Conf. on Intelligent Robots and Systems (IROS), pp. 2219-2225 (2006).
Schaul, et al., "Prioritized experience replay," arXiv 1511.05952, pp. 1-21 (2015).
Shani, et al., "A survey of point-based POMDP solvers," Autonomous Agents and MultiAgent Systems, vol. 27(1), pp. 1-51 (2013).
Singh, et al., "Learning without state-estimation in partially observable Markovian decision processes," Proc. 11th Int'l Conf, on Machine Learning, pp. 284-292 (1994).
Smallwood, et al., "The Optimal Control of Partially Observable Markov Processes over a finite horizon," Operations Research, vol. 21(5), pp. 1071-1088 (1973).
Sondik, "The Optimal Control of Partially Observable Markov Processes," PhD thesis, Stanford University, (1971) (Abstract only).
Srivastava, et al., "Training very deep networks," Proc. Advances in Neural Information Processing Systems (NIPS 2015), pp. 2377-2385 (2015).
Sukhbaatar, et al., "End-to-end memory networks," Proc. Advances in Neural Information Processing Systems (NIPS 2015), pp. 2440-2448, 2015.
Sutskever, et al., "Sequence to sequence learning with neural networks," Advances in Neural Information Processing Systems, vol. 27, pp. 3104-3112 (2014).
Whitehead, et al., "Learning to perceive and act by trial and error," Machine Learning, vol. 7, pp. 45-83 (1991).
Williams, "Simple statistical gradient-following algorithms for connectionist reinforcement learning," Machine Learning, vol. 8(3), pp. 229-256 (1992).
Williams, et al., "Partially observable Markov decision processes for spoken dialog systems," Computer Speech & Language, vol. 21(2), pp. 393-422 (2007).
Zimmermann, et al., "Active portfolio-management based on error correction neural networks," NIPS, pp. 1465-1472 (2001).

* cited by examiner

NON-MARKOVIAN CONTROL WITH GATED END-TO-END MEMORY POLICY NETWORKS

BACKGROUND

The exemplary embodiment relates to a system and method employing a model for predicting a next action, given a sequence of observations, which find particular application in connection with dialog management systems and other systems where an unbounded set of past observations is useful in predicting actions, such as natural language understanding, and asset acquisition, when not all state information is available.

Partially observable environments present a challenge in the domain of sequential control learning with delayed rewards. In dialog systems for example, the aim may be to be able to predict a next dialog act for a virtual agent in order to progressively refine a dialog state through a dialog with a person. In asset acquisition, where the future price is unknown, and there may be a number of potential assets to acquire, as in stock purchases, the aim may be to purchase assets to maximize a return on investment or to select an amount of a given asset to trade.

Reinforcement learning (RL) algorithms and associated approximate models have been applied in such contexts. Reinforcement learning systems are designed to adapt their behavior in order to maximize a reward signal. Actions may affect not only an immediate reward but also the next situation and thereby affect subsequent rewards. In learning a model to predict actions, the aim is to capture aspects of the problem facing an agent interacting with its environment that has some knowledge of the state of the environment and whose actions affect the state. RL algorithms have generally assumed Markovian state transitions.

In realistic environments, reinforcement learning methods typically need to deal with incomplete and noisy state information resulting from partial observability, as formalized by Partially Observable Markov Decision Processes (POMDPs) (Sondik, E., "The Optimal Control of Partially Observable Markov Processes," PhD thesis, Stanford University, 1971). In addition, they often need to deal with non-Markovian problems where there are significant dependencies on earlier states. Both POMDPs and non-Markovian problems largely defy traditional fully parametric value function or policy based approaches and currently require handcrafted state estimators based on accurate knowledge of the system. Neural networks using a value function or policy over a reinforcement learning approach have been proposed for solving continuous control problems. Several recent approaches have applied model-free, direct policy search methods to the problem of learning neural network control policies for dealing with continuous domains with many degrees of freedom. (Balduzzi, D., et al., "Compatible value gradients for reinforcement learning of continuous deep policies," arXiv 1509.03005, 2015; Heess, N., et al., "Learning continuous control policies by stochastic value gradients," Adv. in Neural Information Processing Systems (NIPS) 28, pp. 2944-2952, 2015; Levine, S., et al., "End-to-end training of deep visuomotor policies," arXiv 1504.00702, 2015). However, these approaches assume a fully observed state.

An alternative approach to using memory is learning reactive stochastic policies which simply map observations to probabilities of actions (Singh, S. P., et al., "Learning without state-estimation in partially observable Markovian decision processes," Proc. 11th Int'l Conf. on Machine Learning, pp. 284-292, 1994). The underlying assumption is that state-information does not play a crucial role during most parts of the problem and that using random actions can prevent the policy from getting stuck in an endless loop for ambiguous observations. This approach is often far from optimal and algorithms that use some form of memory remain useful.

In recent approaches, Long Short Term Memory (LSTM), has been proposed for control learning (Bellemare, M. G., et al., "The arcade learning environment: An evaluation platform for general agents," J. Artif. Intell. Res. (JAIR), 47:253-279, 2013; Hausknecht, M. J., et al., "Deep recurrent Q-learning for partially observable MDPs," arXiv: 1507.06527, 2015). This approach, however, uses a fixed size memory model, which does not allow for updates to the model during use.

There remains a need for an adaptive model which is applicable to non-Markovian environments.

INCORPORATION BY REFERENCE

U.S. application Ser. No. 15/429,344, filed Feb. 10, 2017, entitled GATED END-TO-END MEMORY NETWORK, by Julien Perez, et al. (Perez 2016), is hereby incorporated by reference in its entirety.

BRIEF DESCRIPTION

In accordance with one aspect of the exemplary embodiment, a method for predicting a sequence of actions includes providing an end-to-end neural network model comprising a sequence of at least one hop. Each of the hops includes supporting memories. Each supporting memory including memory cells generated from a set of observations for an environment, generated at different times. A sequence of actions is predicted which includes first and second actions to be performed. The predicting of the first action includes receiving an agent input comprising a value for each of a set of agent-specific variables. For each hop, an updated controller state is computed. This includes applying a transform gate mechanism to an input controller state to generate first and second gate transforms, wherein for a first of the sequence of hops, the input controller state is generated from the agent input and for a subsequent hop, the input controller state is the updated controller state of the preceding hop. An output of the supporting memories is computed based on the input controller state. An elementwise product of the output of the supporting memories and first gate transform is combined with an elementwise product of the input controller state and the second gate transform to generate the updated controller state. The first action is predicted based on the updated controller state of a terminal one of the hops. The values of the agent input are updated, based on the first action. The predicting of the second of the sequence of actions to be performed includes repeating the computing of an updated controller state for each hop, wherein for a first of the sequence of hops, the input controller state is generated from a previously generated updated agent input. The second action is predicted, based on the updated controller state of a terminal one of the hops.

One or more steps of the method may be performed with a processor.

In accordance with another aspect, a system for predicting a sequence of actions includes memory which stores an end-to-end neural network model including a sequence of at least one hop, each hop including supporting memories, each supporting memory including memory cells generated from a set of observations for an environment at different times. Instructions are stored in memory and a processor is in communication with the memory for executing the instructions. The instructions include instructions for predicting a first of a sequence of actions to be performed, including receiving an agent input comprising a value for each of a set of agent-specific variables, for each hop, computing an updated controller state including applying a gate mechanism to an input controller state to generate first and second gate transforms, wherein for a first of the sequence of hops, the input controller state is generated from the agent input and for a subsequent hop, the input controller state is the updated controller state of the preceding hop, computing an output of the supporting memories based on the input controller state, and combining an elementwise product of the output of the supporting memories and first gate transform with an elementwise product of the input controller state and the second gate transform to generate the updated controller state. Instructions are provided for predicting the first action based on the updated controller state of a terminal one of the hops, and updating the values of the agent input. Instructions are provided for predicting at least a second of a sequence of actions to be performed, including repeating the computing of an updated controller state for each hop, wherein for a first of the sequence of hops, the input controller state is generated from a previously generated updated agent input, and predicting the second action based on the updated controller state of a terminal one of the hops.

In another aspect, a method for learning parameters of an end-to-end neural network model for predicting a sequence of actions includes receiving a set of sequences of observations, each sequence being associate with an agent input comprising a value for each of a set of agent-specific variables. For each of a plurality of hops of the model, supporting memories are generated, based on the observations, including, for each observation, computing an input memory cell and an output memory cell. A transform gate is provided which weights an output of the supporting memories, given an input controller state the input controller state is generated from the agent input and for a subsequent hop, the input controller state is the updated controller state of the preceding hop. For each sequence and for each observation in the sequence, an action is computed, based on the updated controller state of a terminal one of the hops; and parameters of the model are progressively updated to optimize a cumulative reward for the sequence of actions.

One or more steps of the method may be performed with a processor.

DETAILED DESCRIPTION

A reinforcement learning system and method are described which extend LSTM approaches to more sophisticated policy representations capable of representing an observed state using a memory-enhanced model called a Gated End-to-End Memory Policy Network (GMemN2NP). With this model, a policy gradient type of algorithm can be used to learn policies for Partially Observable Markov Decision Processes (POMDPs) using an unbounded memory by leveraging an attention mechanism over past observations. As a result, policy updates can depend on any event in the history of observations. The method is shown to outperform other RL methods on an example task involving continuous control in a non-Markovian trading environment.

The network is able to handle non-Markovian problems where there are significant dependencies on earlier states. The Gated End-to-End Policy Memory Network (an attention-based model) is used for sequential control. It uses a model-free value-based algorithm of policy gradient to learn policies for partially observed domains using the memory-enhanced neural network. This model is end-to-end learnable and features unbounded memory.

Due to its attention mechanism and associated non-parametric memory, the exemplary model is able to define an attention mechanism over the observation stream unlike those normally used in recurrent models. With this model, policy gradient types of algorithms can effectively learn policies using an unbounded memory by leveraging an attention mechanism over the past observations. Results on a stock trading evaluation illustrates the capability of the model in the context of the continuous-state non-stationary control problems.

In one embodiment, a model-free value-based algorithm of policy gradients is used to learn policies for partially observed domains using the GMemN2NP. This model is end-to-end learnable and it features unbounded memory. Indeed, because of its attention mechanism and associated non-parametric memory, the model allows an attention mechanism to be defined over the observation stream unlike those normally used in recurrent models.

Figure 1:
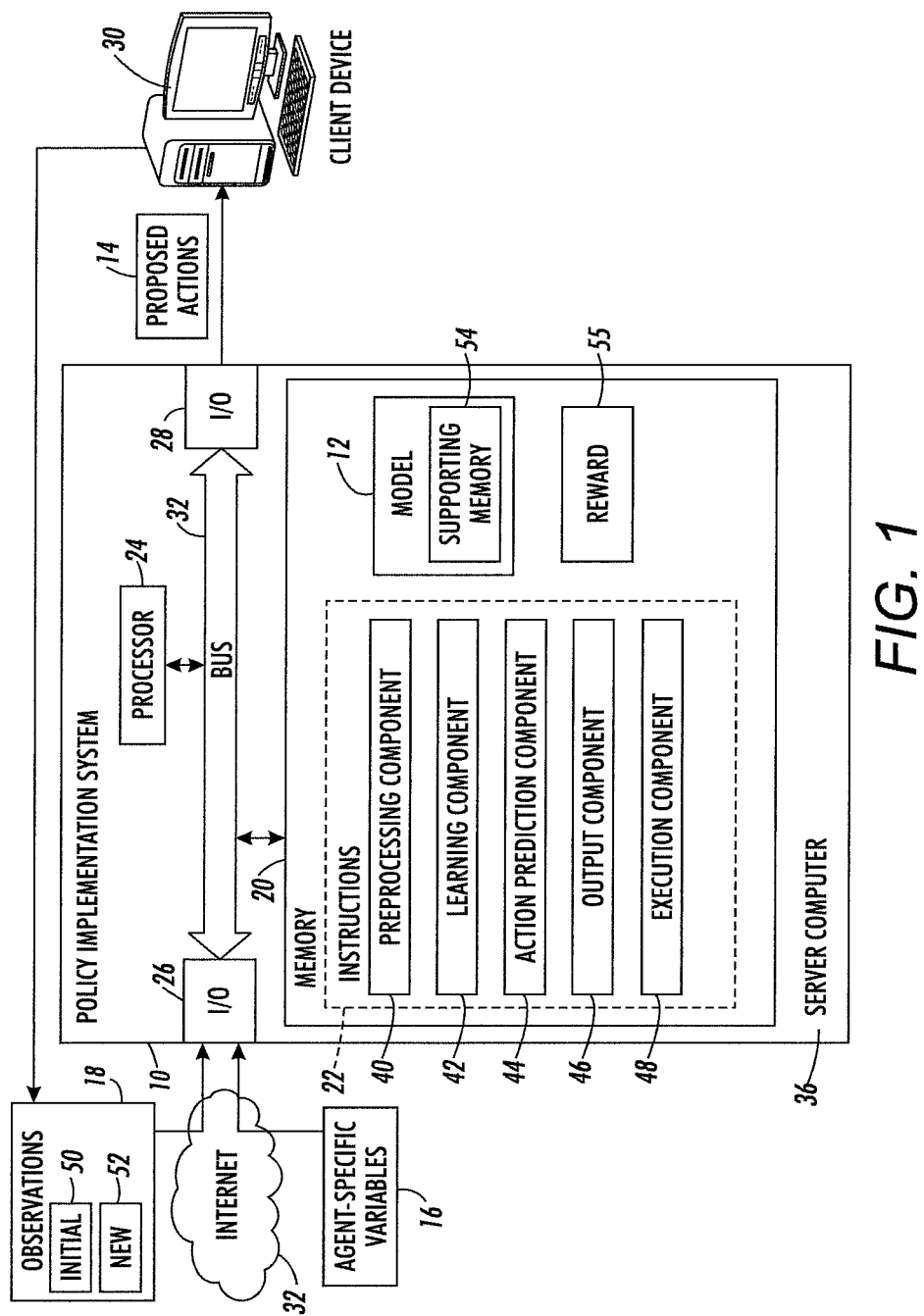
FIG. 1 is a functional block diagram of a system for implementing a policy incorporating a Gated End-to-End Memory Policy Network model in accordance with one aspect of the exemplary embodiment.

With reference to FIG. 1, a computer implemented policy implementation system 10 employs a model 12 in the form of a Gated End-to-End Memory Policy Network for predicting actions 14 based on an agent input 16 of agent-specific variables and a sequence of observations 18. The system includes memory 20, which stores the model 12 as well as instructions 22 in the form of software for performing the exemplary method. A processor 24, in communication with the memory 20, executes the instructions. In particular, the processor 16 executes instructions for performing the method outlined in FIG. 2. The processor may also control the overall operation of the computer system 10 by execution of processing instructions which are stored in memory 20. Computer system 10 also includes one or more input/output (I/O) interface(s) 26, 28 for communicating with external devices, such as computer device(s) 30 which outputs the observations 18 and/or agent specific variables 16 and/or receives the proposed actions 14, e.g., via wired or wireless links 32 such as a local area network, telephone line, or a wide area network, such as the Internet. The various hardware components 20, 24, 26, 28 of the computer system 10 may be connected by a data/control bus 32. The system may be hosted by one or more computing devices, such as the illustrated server computer 36. The remote computing device 30 may serve as a user interface and/or a user interface may be linked directly to the computer 36.

The computer system 10 may include one or more of a PC, such as a desktop, a laptop, palmtop computer, portable digital assistant (PDA), server computer, cellular telephone, tablet computer, pager, combination thereof, or other computing device capable of executing instructions for performing the exemplary method.

The memory 20 may represent any type of non-transitory computer readable medium such as random access memory (RAM), read only memory (ROM), magnetic disk or tape, optical disk, flash memory, or holographic memory. In one embodiment, the memory 20 comprises a combination of random access memory and read only memory. The network interface(s) 26, 28 may each comprise a modulator/demodulator (MODEM) a router, a cable, and and/or Ethernet port. Memory 20 stores processed data, such as proposed actions 14, in addition to the instructions 22 and model 12, and may be distributed over one, two or more computing devices. The digital processor 24 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated instructions 22 include a preprocessing component 40, a learning component 42, an action prediction component 44, an output component 46 and an execution component 48. Briefly, the preprocessing component 40 receives the observations 18 and values for the agent specific variables 16 (or information from which they can be generated), and stores them in a form which can be input to the model 12, e.g., as multidimensional vectors. The learning component 42 learns parameters of the model 12 using an initial set 50 of the observations and adapts the model memory as new observations 52 are received. The model 12 includes supporting memory 54 composed of memory cells, which are used to store information based on the observations. The goal of model learning is to adapt parameters of the model 12 to optimize a cumulative reward 56 over a sequence of actions taken over a period of time. The action prediction component 44 uses the trained model 12 to generate a sequence of proposed actions 14, given an input set of values for a set of agent-specific variables 16. The output component 46 outputs the sequence of proposed actions 14 and/or information based thereon, to a user and/or to the execution component 48. The execution component 48 (or the user) implements the proposed actions and updates the values of the agent specific variables 16, based on the actions. In some embodiments, the execution component implements a further process based on a final state resulting from the sequence of actions.

As an example, the system 10 is a diadic dialog system for conducting a dialog between a virtual agent and a human user of the system, e.g., for instantiating a set of variables for defining a transaction. The observations 18, in this case, are representations of sequences of utterances (of the user and optionally also a virtual agent) and the agent-specific variables 16 are the variables of the dialog state to be instantiated. Initially, in a sequence of utterances, the values of the variables may all be unknown. The actions, in this case, are dialog acts of the agent, which may be limited to a predefined set of dialog acts or types of dialog act. For example, in a system for hotel booking, the variables of the dialog state are the agent-specific variables to be instantiated with values and may include, for example, location, price range, start of stay, number of nights, and the like. The dialog acts may be represented as a sequence of words or as an underlying form from which a sequence of words can be generated. For example "Request location {North, South, East}" could be used to generate an agent utterance "Would you like a hotel in the north, south, or east of the city?"

Dialog systems of this type are described, for example, in U.S. Pub. No. 20150095033, published Apr. 2, 2015, entitled TECHNIQUES FOR UPDATING A PARTIAL DIALOG STATE, by Boies, et al.; U.S. application Ser. No. 15/451,860, filed Mar. 7, 2017, entitled DIALOG STATE TRACKING WITH A PRIOR KNOWLEDGE-DRIVEN RELATIONAL REPRESENTATION LEARNING APPROACH, by Julien Perez, et al.; U.S. application Ser. No. 14/864,076, filed Sep. 25, 2015, entitled GENERATIVE/DISCRIMINATIVE APPROACH FOR TRANSACTIONAL DIALOG STATE TRACKING VIA COLLECTIVE MATRIX FACTORIZATION, by Julien Perez, et al.; U.S. application Ser. No. 15/342,590, filed Nov. 3, 2016, entitled, PROBABILISTIC MATCHING FOR DIALOG STATE TRACKING WITH LIMITED TRAINING DATA, by Julien Perez, et al.; U.S. application Ser. No. 15/350,269, filed Nov. 14, 2016, entitled MACHINE READING METHOD FOR DIALOG STATE TRACKING, by Julien Perez; and Williams, et al., "Partially observable Markov decision processes for spoken dialog systems," Computer Speech & Language, 21(2):393-422, 2007, the disclosures of which are incorporated herein by reference in their entireties.

Other tasks where the method finds application include resource allocation and scheduling. For example, the method finds application in allocation of resources that are limited, where decisions have to be made at a sequence of times, e.g., allocation of patient beds in a hospital emergency room could be one application, where the rewards are computed by assigning numerical values to outcomes. Another application could be allocation and/or scheduling of printers where the observations could corresponding to the availability of a set of printers, and the reward could be a function of the print jobs that are completed on time.

Figure 2:
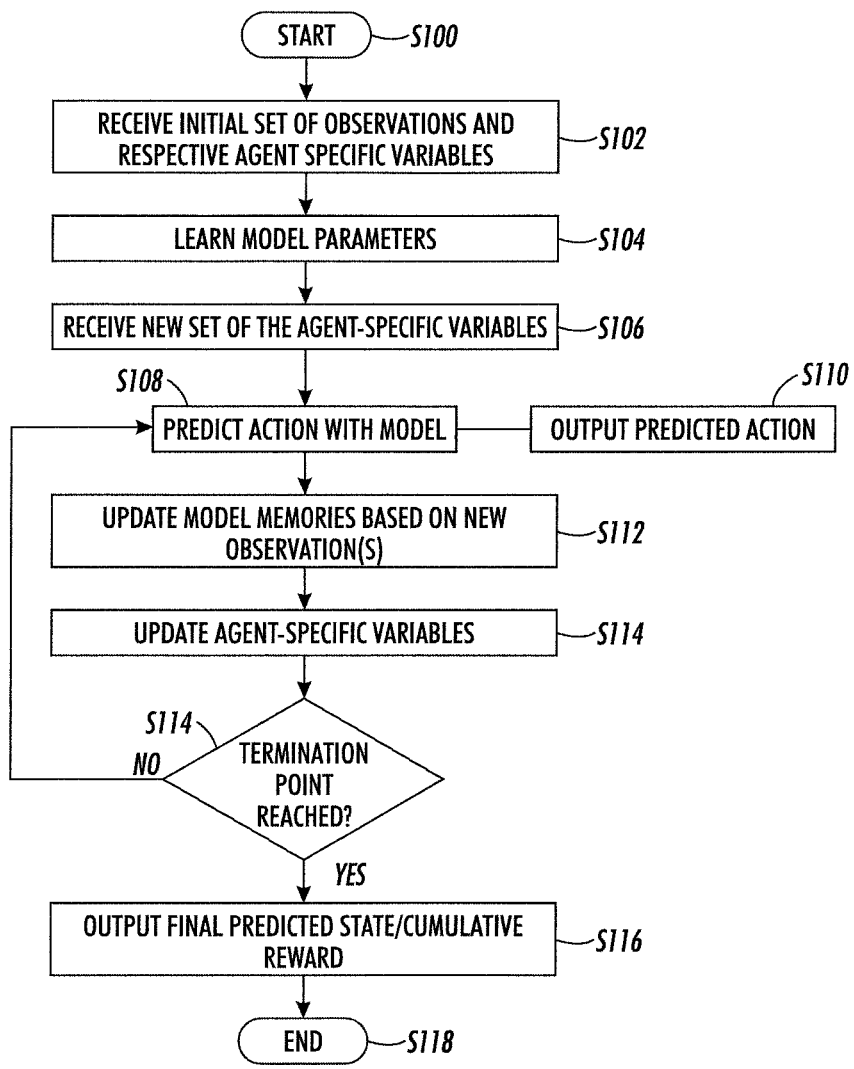
FIG. 2 is a flow chart illustrating a method for predicting actions in accordance with another aspect of the exemplary embodiment.

With reference to FIG. 2, a method for policy-based prediction which can be performed with the system 10 of FIG. 1 is shown. The method begins at S100.

At S102, an initial set 50 of observations is received and stored in memory 20. The initial set of observations 50 includes a set of sequences of observations, each sequence including a plurality of observations of the state of an environment at different times. Each sequence is associated with values for the agent-specific variables. The observations 50 may be preprocessed by the preprocessing component 40.

At S104, the model 12 is learned, by the learning component 42. This includes incorporating information derived from the observations into the memory cells 54 and learning parameters of the model 12 by evaluating the rewards of proposed actions taken by an agent, given the past observations and the input set of values for the agent-specific variables for each sequence of observations. In general, the agent-specific variables for the training set of observations are the same as used in testing. An exemplary learning algorithm is described below.

Following training of the model, at S106, a new set of values for the agent-specific variables 16 is received and may be stored in memory.

At S108, a first of a sequence of actions 14 is predicted, using the model 12, based on the set of values for the agent-specific variables and the current model memory cells 54. A reward for the action may be computed.

At S110, the predicted action for that time step is output, e.g., to the execution component 48 or a user for implementation of the predicted action.

At S112, before, during, and/or after the prediction of the first action, the model memory 54 is updated, based on new observations 52 received after the model 12 was initially learned. These observations may reflect a change in the state of the environment as a result of the prior action taken at S110.

At S114, the values of the agent specific variables are updated, based on the predicted action.

If at S116, a termination point is reached, which may depend on the application, the method proceeds to S118. Otherwise, the method returns to S108, where a next of the sequence of actions is predicted, using the model 12.

At S116, the final state (updated agent specific variables and/or cumulative reward for the sequence of time steps) is output and/or may be used in a subsequent process (e.g., booking a hotel reservation in the travel-booking scenario).

The method ends at S118.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments, one or more of the steps may be at least partially performed manually.

As will be appreciated, the steps of the method need not all proceed in the order illustrated and fewer, more, or different steps may be performed.

In the following, a Gated End-to-End Memory Policy Network for memory-enhanced reinforcement learning is described. A specific application of the model as a policy network is described.

As used herein:

An "agent" is an active decision-making entity which interacts with an environment with the objective of achieving a goal despite uncertainty about the state of the environment. An agent is able to take actions which are permitted to affect the future state of the environment.

A "policy" is a decision making rule which defines the agent's way of behaving at a given time. In the present system and method, the policy is implemented through a gated end-to-end memory network, as described below.

An environment exists in one of a set of possible states at a time.

A "state" can be defined by a value for each of a predefined set of variables, where each variable has more than one possible value, such as a set of predefined values or a range of possible values.

An "observation" includes information about the current state of the environment. In the present method, at least some observations provide only partial information about the current state of the environment, for example, one or more state variables are unknown or cannot be predicted with a threshold level of certainty.

A "reward function" defines the goal in a reinforcement learning problem. In general, it maps each perceived state (or state-action pair) of the environment to a single number, a reward, indicating the intrinsic desirability of that state. A reinforcement learning agent's objective is to maximize the total reward it receives in the long run.

In the standard setting in Reinforcement Learning (RL), an agent interacts with an environment ε during a potentially infinite number of discrete time steps. At each time step t, the agent observes a state $s_t \in S$ (i.e., $s_t$ is one of the set S of possible states) and chooses an action $a_t$ from some set of admissible actions A by using its policy π, where π is a function from states $s_t$ to actions $a_t$. As a result, the agent observes the next state $s_t+1$ and receives a scalar reward $r_t$. The process continues until the agent reaches a terminal state.

The return $R_t$, may be defined as:

$$R_t = \Sigma_{k=0}^{\infty} \gamma^k r^{t+k},$$

which is the total accumulated reward from time step t with a discount factor $\gamma \in [0,1]$. k is the number of hops. The goal of the agent is to maximize the expected return from each state $s_t$.

The action value $Q^\pi(s, a) = \mathbb{E}[R_t | s_t = s, a]$ is the expected return for selecting an action a in state s and following a given policy π. The optimal value function $Q^*(s, a) = \max_\pi Q^\pi(s, a)$ gives the maximum action value for state s and action a achievable by any policy. Similarly, the value of state s under policy π is defined as $V^\pi(s) = \mathbb{E}[R_t | s_t = s]$ and is simply the expected return for following policy π it from state s.

In value-based model-free reinforcement learning methods, the action value function can be modeled using a function approximator, such as a neural network. Q(s, a; θ) is an approximate action-value function with parameters θ. Updates to the parameters θ can be defined by a variety of reinforcement learning algorithms. One example of such an algorithm is Q-learning, which aims to approximate directly the optimal action value function: $Q^*(s, a) \approx Q(s, a; \theta)$. In one-step Q-learning, the parameters θ of the action value function $Q(s, a; \theta)$ are learned by iteratively minimizing a sequence of loss functions, where the ith loss function is defined as:

$$L_i(\theta_i) = \mathbb{E}(r + \gamma \max_{a'} Q(s', a'; \theta_{i-1}) - Q(s, a; \theta_i))^2$$

where s' is the state encountered after state s. This standard formulation of the problem is called a Markov Decision Process. It assumes that the environment is Markovian, which means the transition to a state $s_{t+1}$ is only conditioned by the $\{s_t, a_t\}$ pair. The present system and method provide for reinforcement learning for making predictions in non-Markovian environments where only observations $z_t$ of the state $s_t$ are available and the transition to a state $s_{t+1}$ is not based solely on the most recent state $s_t$ and action $a_t$.

Figure 3:
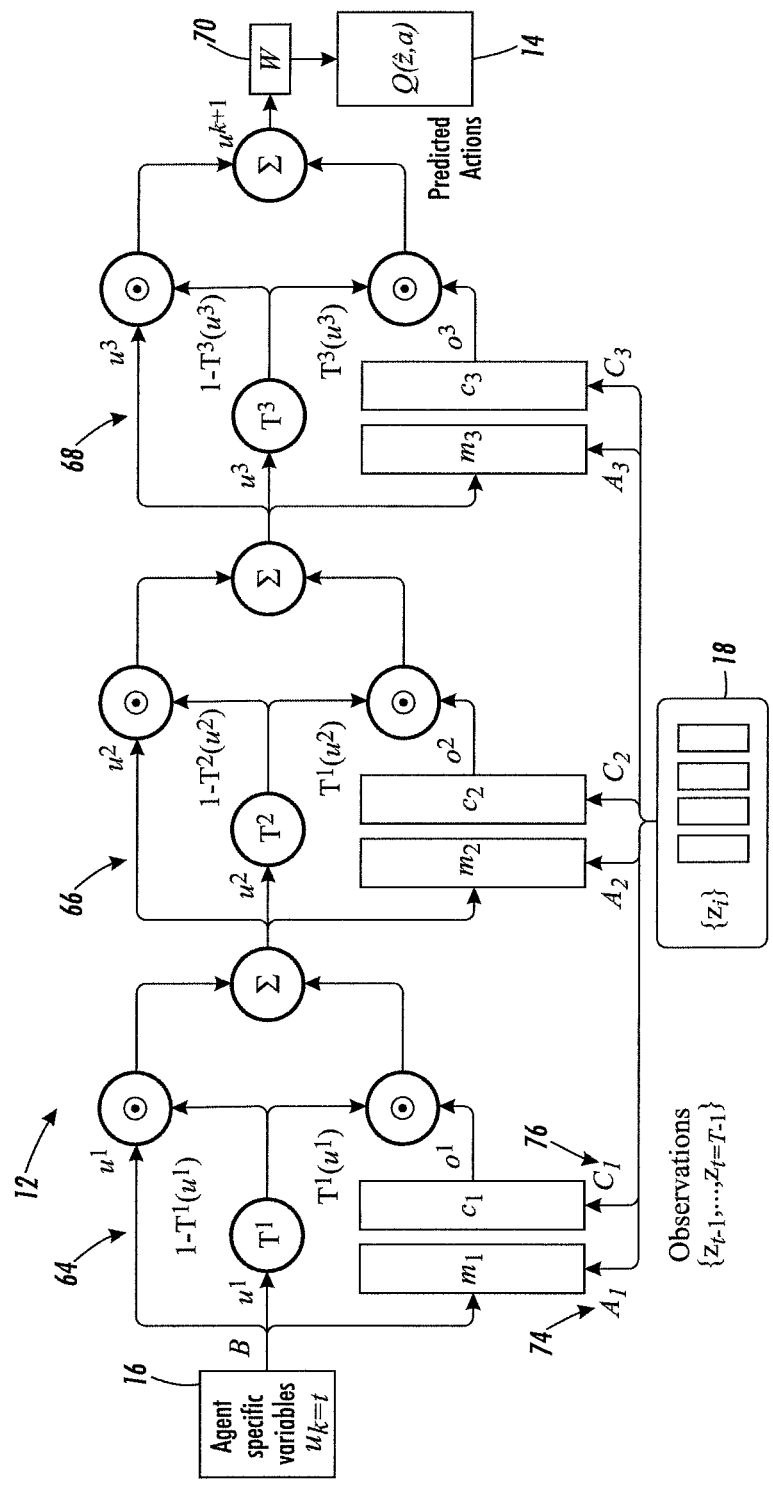
FIG. 3 illustrates a Gated End-to-End Memory Policy Network model in the system of FIG. 1.

A Gated End-to-End Memory Policy Network 12, which includes an unbounded and attention-based recurrent neural model equipped with a gated memory access mechanism (Gated Memory Network) and its adaptation to control will now be described. The model 12 shown in FIG. 3 predicts, at any stage of a sequence of actions, what action 14 an agent should take next. The model 12 computes the expected reward regarding a given action that can be taken, given a set 18 of observations $z_t$ of the state of the environment at different times t. The agent does not have access to the true state of the environment, but receives observations of the state instead. Each observation is assumed to be generated from an underlying state of the environment according to the probability distribution $z \sim \mathcal{Z}(s) = P(z_t|s_t)$, where $s_t$ is the underlying state. The goal of the agent is to infer a policy $\pi$: $\mathcal{Z}_{1:t} \rightarrow a_t$ in order to maximize the cumulative reward over a sequence of actions, $a_{t=1}, a_{t=2}, \ldots a_{t=T}$.

The set 50 of past observations input to the model 12 can include a large number of observations, such as at least 5 or at least 10, or at least 50, or at least 1000 or more. The observations are not compressed into a single representation, but are individually input to the model. As actions are taken, new observations 52 are received and input to the model. Values of the agent-specific variables $v_k$ 16 are also input to the model. These correspond to the current knowledge of the agent. While described as variables, the values of the agent-specific variables can vary throughout the sequence of actions or in some embodiments, be constant in value.

The illustrated model 12 includes a series of layers or "hops" 64, 66, 68. While three hops are shown, any number can be used, such as 1, 2, 3, 4, 5 or up to 10 or more hops. In each hop, an attention is computed over the history of observations 60 and the controller state u is updated. The output $u_{k+1}$ of the terminal hop, here hop 68, is projected, using an output matrix W 70, over the possible set of actions to generate a predicted action 14.

Each hop thus takes as input the history of observations and agent specific variables or controller state, and learns to extract information from the observations in order to project over the expected reward for each of the possible actions of the control problem.

Figure 4:
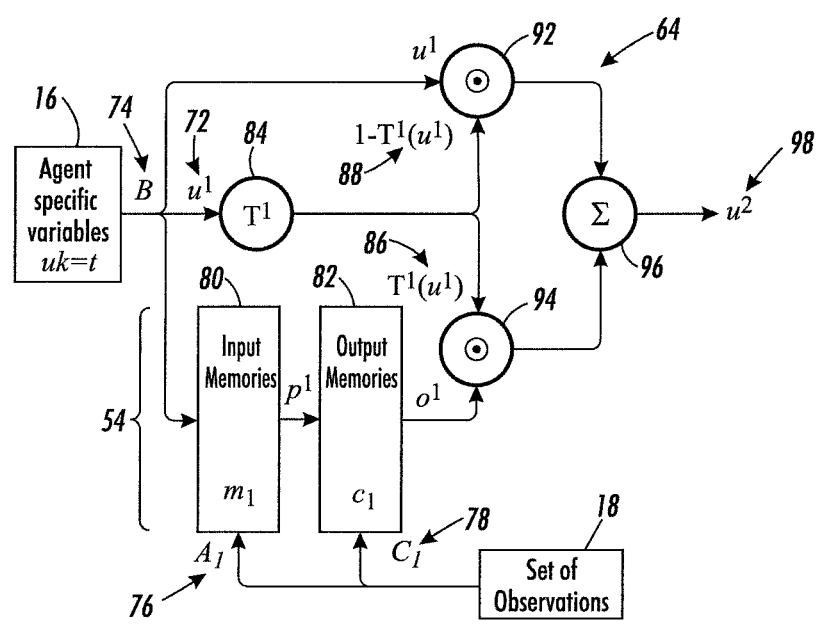
FIG. 4 is an enlarged view of one hop of the model of FIG. 3.

FIG. 4 shows the first hop 64, by way of example.

The agent specific variables 16, e.g., in the form of a vector $v_k$ of dimensionality $d_{v_k}$, is transformed to a first controller state $u^1$ 72 of dimensionality d, using an agent variable transformation, such as a matrix B 74 ($u^1 = v_k \times B$), where $B \in \mathbb{R}^{d \times d_{v_k}}$.

The model further includes first and second embedding transformations, e.g., embedding matrices $A_1$ 76 and $C_1$ 78, both of size $d \times d_o$, where d is the embedding size and $d_o$ is the dimension of the observations gathered from the environment. Each of the set 18 of observations, in the form of a vector $z_i$, is transformed by the embedding matrices into respective $d_o$-dimensional vectors which are stored as memory cells of input and output memories 80, 82 of the model supporting memory 54. The input and output memory cells may be denoted by $m_i$ and $c_i$, respectively. The embedding matrix $A_1$ may be applied to $z_i$ such that $m_i = A_1 \varphi(z_i)$, where $\varphi(\ )$ is a function that maps the input into a bag of dimensions $d_o$. The embedding matrix $C_1$ may be applied to $z_i$ such that $c_i = C_1 \varphi(z_i)$.

One limitation of neural networks employing supporting memories, such as this, compared to other types of attention-based models, like those applied to machine translation, is the necessity to encode temporal information into the memory blocks. In view of the noncommutative nature of Eqn. 2, any information regarding the order of the observations embedded in the memory blocks 80, 82 is encoded beforehand. In the exemplary model 12, the observation signal 18 can embedded using a denoising and predictive neural auto-encoder. More specifically, the single hidden layer of the perceptron reconstructing the noisy input of the time frame is placed into the memory blocks. This means that the model is only a denoiser. However, by adding output to the model, the neural network can predict future windows regarding the encoded time frame. This approach is similar to the context-dependent word vectorization (Mikolov, T., et al., "Efficient estimation of word representations in vector space," arXiv 1301.3781, 2013; Pennington, J., et al., "Glove: Global vectors for word representation," Proc. Conf. on Empirical Methods in Natural Language Processing (EMNLP 2014), A meeting of SIGDAT, a Special Interest Group of the ACL, pp. 1532-1543, 2014). Before incorporating into the memory using the A and C transformation matrices, the auto-encoder is used to compute a temporal dependent representation of the state which is used as input to the gated memory policy network.

Each hop has its own set of transformations $A_k$ and $C_k$ and respective input and output memory cells $m_i$ and $c_i$. As new observations are received, these are incorporated as new memory cells of memories 80, 82. Thus, the attention model is not limited to the last observation, as in a Markov decision process, or a single representation of a set of observations, in forming the prediction, but can have an unbounded memory. The model learns what observations in the possibly distance past are important in learning to predict actions over a sequence of time steps.

The vector $u^1$ is adapted using the input and output memories 80, 82 to generate an output observation vector $o^1$ 90. The input memories $\{m_i\}$, together with the embedding $u^1$ are utilized to determine the relevance of each of the observations in the context, yielding an attention vector $p^1$ composed of attention weights $p_i$:

$$p_i = \text{softmax}(u^T m_i) \text{ where} \qquad (1)$$
$$\text{softmax}(a_i) = \frac{e^{a_i}}{\sum_{j \in [1,n]} e^{a_j}}$$

and T is the transpose operator.

i.e., each value of $p^1$, is computed as the dot product of the respective values of $u^1$ and $m_i$, which can be converted to a value between 0 and 1 using a softmax function: $p_i$=softmax$(u^{1T}m_i)$. $p^1$, in turn, is transformed by output memories $\{c_i\}$ to generate an output vector $o^1$ of values $o_i$ according to:

$$o^1 = \sum_i p_i c_i \quad (2)$$

i.e., computing, for each of the output memory cells $c_i$, the product of $p_i$ and $c_i$, then computing a linear combination of the results.

The controller state vector $u^1$ is input to a first transform gate mechanism $T^1$ 84, which outputs first and second gate transforms denoted $T^1(u^1)$ 86 and $1-T^1(u^1)$ 88. Each u is a vector.

The first and second gate transforms, $T^1(u^1)$ and $1-T^1(u^1)$, can be computed as:

$$T^k(u^k)=\sigma(W_T^k u^k + b_T^k) \quad (3)$$

where $W_T^k$ is a hop-specific parameter matrix, $b_T^k$ is a bias term for the kth hop and $T^k(u^k)$ denotes the transform gate for the kth hop. σ denotes a vectorization sigmoid function.

The vectorization sigmoid function may be used to reduce the influence of extreme values or outliers in the data without removing them from the data set and to generate an output $T^k(u^k)$ e.g., of from 0 to 1.

The controller state $u^1$ is updated to generate a new controller state $u^2$. As illustrated schematically in FIG. 4, $u^1$ and $1-T^1(u^1)$ are combined at 92, and $o^1$ and $T^1(u^1)$ are combined at 94. The results are aggregated at 96 to generate the output $u^2$ 98, which serves as the input to the next hop 66. The output controller state $u^2$ (more generally, $u^{k+1}$) of each hop 64 is thus computed as the sum of the two elementwise products.

$$u^{k+1}=o^k \lfloor T^k(u^k) + u^k \lfloor (1-T^k(u^k)) \quad (4)$$

where $\lfloor$ denotes the elementwise product.

This procedure is repeated for the subsequent hop(s) using the updated controller state $u^{k+1}$ as the input.

As can be seen from Equation (3), the gate mechanism may determine how the current state of the controller and the output affect a subsequent, or updated, controller state. In a simple example, when $T^k(u^k)=1$, then the next controller state $u^{k+1}$ would be controlled by the output $o^k$. Conversely, when $T^k(u^k)=0$, then the next controller state $u^{k+1}$ would be controlled by the current state $u^k$. In one embodiment, $0<T^k(u^k)<1$ for one or all of the hops.

After the final hop, $u^{K+1}$ is the summation over $o^K$ and $u^K$, thus the predicted action a may be sampled from a distribution of actions computed according to:

$$\hat{a}=\text{softmax}(W(o^K + u^K)) \quad (5)$$

where $\hat{a}$ is the predicted action distribution, $W \in \mathbb{R}^{d o \times d}$ is a parameter matrix for the model to learn, and K is the total number of hops.

Two types of constraints on $W_T^k$ and $b_T^k$ in Eqn. (3) are contemplated:
1. Global: all the weight matrices $W_T^k$ and bias terms $b_T^k$ are shared across different hops, i.e., $W_T^1 = W_T^2 = \ldots W_T^K$ and $b_T^1 = b_T^2 = \ldots b_T^K$.
2. Hop-specific: each hop has its specific weight matrix $W_T^k$ and bias term $b_T^k$ for $k \in [1, K]$ and they are optimized independently.

The model 12 is designed for Reinforcement Learning (RL), where an agent interacts with an environment ε during a potentially infinite number of discrete time steps. In specific embodiments, the model is used for policy learning.

The memory cells of input and output memories 80, 82 are filled with past observations collected from past interactions with the environment, and the agent input 18 contains current state information which is relevant to the agent and independent of the environment observations.

For example, in the context of stock trading and optimized execution, the memory blocks 80, 82 may carry the past values of the traded signal derived from the observations, which may be stock prices provided, for example, by a stock exchange on which the stocks are traded. The agent specific variables 62 may carry the current budget and portfolio composition of the agent, e.g., the number of shares of each stock or the value of each stock in the portfolio. By assuming a discrete action set, the output of the model will be the expected reward associated to each eligible action. In one example, the possible actions (assuming the goal is to maximize a long term gain) may be hold, buy, and sell. The model outputs the expected gain to the portfolio of the three possible actions and identifies the optimum action to take, with respect to the stocks in the portfolio. The agent is assumed to take the predicted actions, which can thus influence the agent-specific variables $v_k$ 62 for the next time step (e.g., if a buy or sell action is generated, the agent will have more or less of a given stock in the portfolio).

The parameters θ of the model, matrices A and C for each hop, matrix B, and matrix W, are learned, using the initial set of observations 50, to optimize the predicted actions for subsequent time periods.

The model thus described is capable of dynamically conditioning the memory reading operation on the controller state $u^k$ at each hop. The adaptive gating mechanism used herein is capable of learning to dynamically control the information flow based on the current input. In the present system and method, the attention mechanism provided by the supporting memories 54 is coupled with a deep recurrent Q-Network. Deep Q-Networks (DQNs) learn to estimate the Q-Values (or long-term discounted returns) of selecting each possible action from the current state.

The system and method facilitate reinforcement learning for Partially Observable Markov Decision Processes (POMDP). A POMDP models an agent decision process in which it is assumed that the system dynamics are determined by a Markov Decision Process (MDP), but the agent cannot directly observe the underlying state. Instead, it must maintain a probability distribution over the set of possible states, based on a set of observations and observation probabilities, and the underlying MDP. Formally, a POMDP is described as a 6-tuple ($\mathcal{S}$, $\mathcal{A}$, $\mathcal{P}$, $\mathcal{R}$, ω, $\mathcal{Z}$) where $\mathcal{S}$ is a set of states, $\mathcal{A}$ is a set of actions, $\mathcal{P}$ is a set of conditional transition probabilities between states which is a function of the state and action at time t $P(S_{t+1}|S_t, A_t)$, $\mathcal{Z}$ is a reward function $\mathcal{Z}$: $S \times A \to \mathbb{R}$ of a Markov Decision Process (MDP), and ω is a set of observations. Since the agent does not have access to the true system state, it receives an observation $o \in \omega$ instead. This observation is assumed to be generated from the underlying system state according to the probability distribution $z \sim \mathcal{Z}(s) = P(z_t|s_t)$. The goal of the agent is to infer a policy π: $\mathcal{Z}_{1:t} \to A_t$ in order to maximize the cumulative reward. $a_t \in A_t$, the set of admissible actions at time t.

The attention mechanism described herein allows the Q-network to estimate the underlying system state better, narrowing the gap between the action-value function $Q(z_{t-k:t}, a_t|\theta)$ and the approximate action-value function, $Q(s_t, a_t|\theta)$, where θ represents the parameters of the model 12. The attention enhanced deep Q-network can thus approximate actual Q-values from sequences of observations, leading to better policies in partially observed environments.

To evaluate the model, a simple simulated environment of stock trading is described and compared to fully-connected neural networks and LSTM. However, a differentiable attention mechanism finds application more generally in the context of non-Markovian control.

In the exemplary model 12, policies are represented as gated memory networks. The model builds a vector, i.e., the controller state u, representing its latent state from the multiple attention-based readings of its memory blocks where the environment observations 18 have been stored. The latent state begins with a predefined initial state $u_1$. At each time-step t=1, 2, . . . , n, the network takes as an input a series of observations, and computes its internal state according to a differentiable function $F(z_{1:n}|\theta_f)=u_t$ and outputs a distribution over actions at according to a differentiable function $G(u_t|\theta_g)=a_t$, where $\theta=\theta_f, \theta_g$. $\pi^\theta(a_t|o_{1:t})$ denotes the output of the memory network at time-step t. The differentiable function F is the Gated Memory Network up to the projection over the action space and the differentiable function G is the projection from the last controller state u to the action space A. One method for updating the parameters θ of the policy $\pi^\theta$ is through reinforcement learning using stochastic gradient descent.

$$\Delta\theta_d = \sum_{t=0}^{T-1} \nabla_\theta \log\pi^\theta(a_t | z_{1:t}) G_t \quad (6)$$

See, Williams, R. J., "Simple statistical gradient-following algorithms for connectionist reinforcement learning," Machine Learning, 8(3):229-256 (1992); Peters, J., et al., "Policy gradient methods for robotics," IEEE/RSJ Int'l Conf. on Intelligent Robots and Systems (IROS), pp. 2219-2225 (2006).

While this update is unbiased, in practice it is known to suffer high variance and low converge rate. It has been shown that this update can be rewritten as:

$$\Delta\theta_d = \sum_{t=0}^{T-1} \nabla_\theta \log\pi^\theta(a_t | z_{1:t})(G_t - b) \quad (7)$$

where b is a baseline, which can be an arbitrary function of states visited during an episode. (Williams 1992). Using this general framework of policy-gradient learning via Gated Memory Network, a control model can be defined using a similar approach to that used in the context of language modeling (Sukhbaatar 2015). A constant is defined as $u_1$ and the network produces, as an output, a distribution over the vocabulary.

This kind of approach can be employed in parallel with the control model of Deep Q-Learning (Mnih, V., et al., "Human-level control through deep reinforcement learning," Nature, 518 (7540):529-533, 2015). The convolutional Neural Network designed by Mnih takes as input a contiguous sliding window of video game screens and outputs the Q-values associated to a finite set of eligible actions.

To provide stability in learning parametric policies, Asynchronous Deep Q-Learning can be used as a reinforcement learning algorithm. A suitable algorithm for this purpose is shown in Algorithm 1.

---

Algorithm 1: Asynchronous Q-learning algorithm

```
// θ, θ⁻, and counter T = 0.
Initialize target network weights θ⁻ ← θ
Initialize network gradients dθ ← 0
Get initial state s
repeat
    Take action a with Boltmann policy based on Q(s, a; θ)
    Receive new state s' and reward r
```

$$y = \begin{cases} r & \text{for terminal } s' \\ r + \gamma\max_{a'} Q(s', a'; \theta^-) & \text{for non-terminal } s' \end{cases}$$

Accumulate gradients wrt $\theta$: $d\theta \leftarrow d\theta + \dfrac{\partial(y - Q(s, a; \theta))^2}{\partial\theta}$ $$s = s'$$

```
    T ← T + 1 and t ← t + 1
    if T mod I_target == 0 then
        Update the target network θ⁻ ← θ
    end if
    if T mod I_AsyncUpdate == 0 or s is terminal then
        Update θ using dθ.
        Set gradients dθ ← 0
    end if
until T > T_max
```

---

Algorithm 1 provides Q-Learning with asynchronous update over the θ⁻ and θ parameter sets. Algorithm 1 is used to update the parameters θ of the model (in the illustrated case the parameters are the weights of the input matrices B, $A_1, A_2, A_3, C_1, C_2, C_3$, and transform gate matrices $W_T^1$, $W_T^2$, $W_T^3$, and corresponding bias terms $b_T^1$, $b_T^2$, $b_T^3$, and weights of the output matrix W).

For each of a sequence of times t, an action is taken with a Boltmann policy. This means that the action implemented is not necessarily the one with the highest reward, given the input state s and current model parameters θ. For example, possible actions which can be taken are sampled with a probability which is a function of the computed reward for the respective action, output by matrix W, to provide a tradeoff between exploration and exploitation. A parameter (referred to as the temperature) may be used to control the relative importance of sampling near to the highest reward.

Given the action taken, this results in a new state s' (for computing the next action in the sequence, if there is one) and a reward r, which is the numerical value of the action is computed, based on the difference between the two states.

The parameters of the model are then updated, based on the reward.

In this way, the parameters of the model 12 are updated to reflect the observed rewards of the actions taken on the training set.

The method is repeated for a number of different initial states, each corresponding, for example, to a current dialog state in a dialog in the case of a dialog act predictor, or a current stock portfolio, in the case of a sequence of stock transactions. The learning rate η is used during the update of the θ parameters at the end of the algorithm.

In testing the trained model, the same or a different Boltmann policy as used in training can be used to sample from the possible actions at a given time step rather than always implementing the action with the highest predicted reward.

See, Mnih, V., et al., "Asynchronous methods for deep reinforcement learning," Proc. 33rd Int'l Conf. on Machine Learning (ICML), JMLR Workshop and Conf. Proc., vol.

48, pp. 1928-1937 (2016)) for further details on reinforcement learning algorithms of this type.

5. Example: Trading and Optimized Execution

The field of algorithmic trading groups a large family of methods that have been proposed to perform autonomous decision models over the global financial market. The discipline can be roughly decomposed into two categories. First, predictive methods with deterministic policies entail learning indicators used as support for a deterministic, or stochastic but stationary, decision schema (Levin, A. E., "Stock selection via nonlinear multi-factor models," pp. 966-972. MIT Press, 1995; Zimmermann, H.-G., et al., "Active portfolio-management based on error correction neural networks," NIPS, pp. 1465-1472 (2001)). These methods involve learning actionable patterns used to trigger buying or selling actions based on the history of an identified set of trading signals or external macro-economic information. Second, policy learning has been investigated as a way to learn an investment and portfolio management policy directly from the stock market history and also macro-economic events (Neuneier, R., "Optimal asset allocation using adaptive dynamic programming," Adv. in Neural Information Processing Systems (NIPS), pp. 952-958 (1995); Neuneier, R., "Enhancing Q-learning for optimal asset allocation," Adv. in Neural Information Processing Systems (NIPS), pp. 936-942 (1997); Moody, J. E., et al., "Reinforcement learning for trading, Adv. in Neural Information Processing Systems (NIPS), pp. 917-923 (1998)). More recently, the task of optimized execution has also been studied (Nevmyvaka, Y., et al., "Reinforcement learning for optimized trade execution," Proc. 23rd Int'l Conf. on Machine Learning (ICML 2006), ACM Int'l Conf. Proc. Series, vol. 148, pp. 673-680 (2006)). In this context, the action space is reduced to selling or buying. Indeed, the actual policy been determined by an independent system, the optimized execution algorithm is in charge of applying an order to the market while leveraging on the constant fluctuation of the share prices in order to maximize the profitability of a chosen operation. This execution context can be a useful environment for evaluating non-Markovian decision policy learning.

An example trading environment developed using the OpenAI Gym framework (Brockman, G., et al., "OpenAI gym," arXiv 1606.01540, 2016) is used in order to perform stock exchange and optimized execution, which are two common activities that have been investigated for algorithmic trading.

5.1. Trading Environment

As an evaluation environment, a simplified portfolio management platform was developed. Following the settings proposed in Moody, J. E., et al., "Reinforcement learning for trading," Adv. in Neural Information Processing Systems (NIPS), pp. 917-923 (1998), the decision space of trading consists of a set of three discrete actions $A \in \{Buy, Hold, Sell\}$, assuming a fixed amount of stock exchanged for each action. The observation space $Z \in \mathbb{R}^X$ is the current value of the X stocks considered for trading, each observation is thus an X-dimensional vector. For each transaction, a fixed transaction cost is associated. In a more realistic setting, the transaction cost may be a function of the type and the amount of stocks involved at each decision step. In this experiment, only the task of speculative trading is considered, which means that the reward, measured as the increase of the budget at a given time step, is the result of the change in value of the market shares. In more realistic settings, dividends distributed to shareholders, can also be considered as a potential source of income, especially in multi-year scale and multi-stock management settings.

Another task that can be considered is the optimized execution setting. This entails either selling or buying a given amount of stock in a fixed amount of time (see, Nevmyvaka 2006). For the optimized buying case, the goal is to buy the desired amount of stock at the cheapest price over a given period of time. For the optimized selling case, the goal is pursued by following an acquisition strategy that allows selling at the higher possible price during the given period. A simulation platform has been developed as an OpenAI Gym environment.

Trading Signals

During the experiments, stock indices considered as trading signals (observations). The daily opening prices of a set of real indices have been chosen. However another advantage of using the stock exchange as a data source for non-Markovian control is the possibility to also generate such data synthetically. In the case of trading, the control of the required memory capacity to perform profitable control can be defined by estimating the Markovian order of the series. The memory capacity requirement can be defined as the order of the time series. For the experiments, eight real indices taken from the exchanges in US, Europe and Asia were employed.

5.3. Attention Based Controllers

The Gated End-to-End Memory Policy Network 12 takes as input the past observations of the traded series. At each time step, the network computes the expected reward of each eligible action. The model is optimized through policy gradient, prioritized experience replay (see, Schaul, T., et al., "Prioritized experience replay," arXiv 1511.05952, 2015) and double Q-learning in order to cope with inherent instability of such learning processes. Beyond the stability and convergence rate compared to Q-Learning, such a model allows implementing a Boltzmann type of policy over the reward expectation using one forward pass of the model.

Training Details

In the experiments, the parameterization of the decision model was as suggested in Sukhbaatar, S., et al., "End-to-end memory networks," Proc. Advances in Neural Information Processing Systems (NIPS 2015), pp. 2440-2448, 2015 (Sukhbaatar 2015). In particular, 10% adjacent weight tying and temporal encoding with 10% random noise is used. The learning rate $\eta$ may be initially assigned a value of 0:001 with exponential decay applied every 30 epochs by $\eta/2$ until 100 epochs are reached. Linear start is used in all experiments as proposed by Sukhbaatar 2015. With linear start, the softmax in each memory layer is removed and re-inserted after 30 epochs. The batch size is set to 32 and gradients with an $\ell_2$ norm larger than 10 are divided by a scalar to have a norm of 10. All matrix weights are initialized randomly from a Gaussian distribution with zero mean and $\theta=0.1$, except for the transform gate bias $b_T^k$ for which the mean is empirically set to 0.2. In all experiments, the embedding size d=20 is used. As suggested in Perez 2016, the hop-specific weight tying scheme was employed in all experiments since greater GMemN2N benefits were observed from it than for global weight tying. As in Sukhbaatar 2015, since the memory-based models are sensitive to parameter initialization, each training was repeated 20 times and the best system chosen, based on the performance on a validation set. The temporal neural encoders are learnt individually over each training series and used in testing to preprocess observation sequences before been placed into the memory block of the policy network. The hidden layer dimension of each encoder is set by cross-validation to 25 and optimized using Adam (Kingma, D. P., et al., "Adam: A method for stochastic optimization," arXiv:1412.6980, updated 30 Jan. 2017).

A baseline neural policy network is composed with two hidden layers of 30 hidden units with rectified linear activation and a linear output projection. The baseline LSTM model has a hidden representation of 50 dimensions. All the hyperparameters haven been estimated through cross-validation.

Concerning the policy learning algorithm, the reward function is episodic. At the end of each episode, the agent receives a reward which is the difference between the budget at the end of the period and the initial budget. The network was trained using 200 consecutive days of daily opening values. The training phase entailed 10,000 trading episodes over these sequences of values. The training on a given series represents approximatively one hour on one core of a NVIDIA Tesla P-100 GPU. In this experiment, all policies are learnt independently from one series to another.

The testing phase of each trading experiment is performed using 200 consecutive days of the same markets. In the case of optimized trading, each testing corresponds to 100 rollouts. The resulting policies follow a Bolzmann distribution over the reward predicted by the policy network. Finally, the update period of the Double Q-Learning mechanism is 100 action steps.

Results

Table 1 shows the computed the profitability ratio, which corresponds to the number of days, over the test period, where the agent is profitable. A trading day is qualified as profitable if the difference between the corresponding current budget and the initial budget of the agent is positive. Such evaluation makes sense as a speculative strategy where maximizing the amount of positive market exit opportunities over a given period of time is expected to be maximized. This first results confirms the utility of a control policy equipped with a memorization capability. Then, a control policy equipped with an attention mechanism as the one proposed in this work seems to be confirmed.

Table 1 also shows the evaluation of the proposed policy over an optimized selling task. In such setting, the set of authorized actions are reduced to A={Hold, Sell}. The agent starts each episode with 50 stocks to sell in the trading period. The reward is the resulting accumulated budget at the end of the period. As for trading, the policies are evaluated of a testing series of 100 trading days. In such settings, the proposed policy show encouraging result that confirm the benefit of an attention based mechanism of memory management for learning differentiable policies in non-Markovian environment. For all experiments, the series absolute values are max-normalized in order to accelerate gradient descent and control gradient magnitude. Finally, the necessity of a memory in such task seems to be confirmed by the inferior performance of a memory-less fully connected layer model.

TABLE 1

| Indices | Policy Network | Profitability ratio | Resulting Budget |
|---|---|---|---|
| CAC40 | FCNN | 0.46 +/− 0.037 | 31.98 +/− 0.14 |
|  | LSTM | 0.49 +/− 0.023 | 38.96 +/− 0.12 |
|  | GMemN2NP | 0.53 +/− 0.014 | 39.97 +/− 0.12 |
| GDAXI | FCNN | 0.49 +/− 0.30 | 39.97 +/− 0.20 |
|  | LSTM | 0.54 +/− 0.048 | 51.47 +/− 0.09 |
|  | GMemN2NP | 0.19 +/− 0.019 | 51.48 +/− 0.09 |
| JKII | FCNN | 0.47 +/− 0.034 | 39.97 +/− 0.14 |
|  | LSTM | 0.48 +/− 0.025 | 44.47 +/− 0.09 |
|  | GMemN2NP | 0.51 +/− 0.017 | 44.48 +/− 0.08 |

TABLE 1-continued

| Indices | Policy Network | Profitability ratio | Resulting Budget |
|---|---|---|---|
| NASDAQ100 | FCNN | 0.44 +/− 0.034 | 31.95 +/− 0.21 |
|  | LSTM | 0.45 +/− 0.013 | 49.01 +/− 0.04 |
|  | GMemN2NP | 0.48 +/− 0.023 | 51.84 +/− 0.19 |
| NIKKEI225 | FCNN | 0.48 +/− 0.030 | 49.98 +/− 0.14 |
|  | LSTM | 0.55 +/− 0.052 | 49.76 +/− 3.27 |
|  | GMemN2NP | 0.59 +/− 0.041 | 49.98 +/− 0.14 |
| NYSE100 | FCNN | 0.49 +/− 0.033 | 49.96 +/− 0.19 |
|  | LSTM | 0.43 +/− 0.034 | 50.12 +/− 0.02 |
|  | GMemN2NP | 0.56 +/− 0.033 | 49.96 +/− 0.19 |
| N100 | FCNN | 0.38 +/− 0.032 | 31.97 +/− 0.15 |
|  | LSTM | 0.41 +/− 0.065 | 38.80 +/− 0.02 |
|  | GMemN2NP | 0.43 +/− 0.044 | 36.89 +/− 2.38 |
| RUT | FCNN | 0.43 +/− 0.023 | 38.58 +/− 1.28 |
|  | LSTM | 0.53 +/− 0.015 | 39.97 +/− 0.05 |
|  | GMemN2NP | 048 +/− 0.042 | 45.80 +/− 0.14 |

The attention-based policy network called Gated End-to-End Memory Policy Network can improve non-Markovian decision processes in the specific task of stock trading. However, it is to be appreciated that the stock trading scenario is only illustrative, and easily implemented since there is considerable data available from the stock indices to test the model. Other tasks of resource allocation and scheduling can be easily related to this formal setting. In comparison to the current results using parametric memories like Gated Rectified Units or Long Short Term Memory, attention-based models like the present model, can be useful in the more general case of non-Markovian control.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for predicting a sequence of actions for a dialog system comprising:
   learning parameters of an end-to-end neural network model comprising a sequence of at least one hop, each hop including supporting memories, each supporting memory including memory cells generated from a set of observations for an environment at different times, at least some of the observations each comprising a representation of a sequence of utterances of a human user of the dialog system;
   with a processor, predicting a sequence of actions to be performed by an agent, the sequence including at least a first and a second action, the first and a second actions comprising dialog acts of the agent, the predicting of the first of the sequence of actions, comprising:
   receiving an agent input comprising a value for each of a set of agent-specific variables of a dialog state to be instantiated;
   for each hop, computing an updated controller state comprising:
      applying a gate mechanism to an input controller state to generate first and second gate transforms, wherein for a first of the sequence of hops, the input controller state is generated from the agent input and for a subsequent hop, the input controller state is the updated controller state of the preceding hop,
      computing an output of the supporting memories based on the input controller state, combining an elementwise product of the output of the supporting memories and first gate transform with an elementwise product of the input controller state and the second gate transform to generate the updated controller state;

predicting the first action be performed by the agent, based on the updated controller state of a terminal one of the hops, and updating the values of the agent input based on the first action;

the predicting of the second of the sequence of actions to be performed by the agent comprising:

repeating the computing of an updated controller state for each hop, wherein for a first of the sequence of hops, the input controller state is generated from a previously generated updated agent input;

predicting the second action to be performed by the agent, based on the updated controller state of a terminal one of the hops; and outputting the predicted second action.

2. The method of claim 1, wherein the parameters of the end-to-end neural network model are learned to optimize a cumulative rewards, the cumulative reward being computed for a set of sequences of user actions.

3. The method of claim 1, wherein the sequence of at least one hop comprises at least two hops.

4. The method of claim 1, wherein the input controller state is generated from the agent input with an agent variable transformation in the form of a matrix.

5. The method of claim 1, wherein the supporting memories comprise sets of input and output memory cells that are generated from respective observations with respective transformations.

6. The method of claim 5, wherein an attention vector is composed of attention weights $p_i$ that are computed according to:

$$p_i = \text{softmax}(u^T m_i) \qquad (1)$$

and wherein the output of the supporting memories for each hop k is computed according to:

$$o^k = \sum_i p_i c_i, \qquad (2)$$

where $m_i$ and $c_i$ are the respective input and output memory cells for an ith one of the observations.

7. The method of claim 1, wherein for each hop k of the at least one hop, the first gate transform is computed according to:

$$T^k(u^k) = \sigma(W_T^k u^k + b_T^k) \qquad (3)$$

and wherein the second gate transform is computed according to: $1 - T^1(u^1)$, where: $u^k$ is the input controller state, $W_T^k$ and $b_T^k$ are respectively a hop-specific parameter matrix and a bias term for the kth hop, and $\sigma$ denotes a sigmoid function.

8. The method of claim 1, wherein the updated controller state $u^{k+1}$ for a kth one of the hops is computed according to:

$$u^{k+1} = o^k \odot T^k(u^k) + u^k \odot (1 - T^k(u^k)) \qquad (4),$$

where $o^k$ is the output of the supporting memories and $T^k(u^k)$ and $1 - T^k(u^k)$ are the first and second gate transforms for the kth hop.

9. The method of claim 7, wherein $0 < T^k(u^k) < 1$ for at least one of the hops.

10. The method of claim 1, wherein the predicted action is sampled from a distribution:

$$\hat{a} = \text{softmax}(W(o^K + U^K)), \qquad (5)$$

where $\hat{a}$ is the predicted action distribution, $W \in \mathbb{R}^{d \times d}$ is a parameter matrix, and K is a total number of hops.

11. The method of claim 1, wherein the method includes updating the supporting memories based on an observation received after the predicting of the first of the sequence of actions.

12. The method of claim 1 further comprising learning the model in an end-to-end manner by asynchronous Q-learning.

13. The method of claim 1, wherein each of the observations is a vector.

14. The method of claim 1, wherein each of the observations is a representation of a current state of an environment in which actions are taken.

15. The method of claim 1, further comprising outputting at least one of:

the sequence of actions;

a cumulative reward for each of the actions; and an updated set of values of the agent input.

16. The method of claim 1, wherein the learning of the parameters of the end-to-end neural network model comprises:

receiving a set of sequences of observations, each sequence being associated with an agent input comprising a value for each of a set of agent-specific variables;

with a processor, for each of a plurality of hops of the model:

generating supporting memories based on the observations, including, for each observation, computing an input memory cell and an output memory cell; and providing a transform gate which weights an output of the supporting memories, given an input controller state the input controller state is generated from the agent input and for a subsequent hop, the input controller state is the updated controller state of the preceding hop;

for each sequence and for each observation in the sequence, computing an action based on the updated controller state of a terminal one of the hops; and updating parameters of the model to optimize a cumulative reward for the sequence of actions.

17. The method of claim 16, wherein the parameters of the model include, for each hop, a hop-specific parameter matrix and a bias term for computing the transform gate.

18. A system for predicting a sequence of agent actions comprising:

memory which stores an end-to-end neural network model comprising a sequence of hops, each hop including supporting memories, each supporting memory including memory cells generated from a set of observations for an environment at different times, at least some of the observations each comprising a representation of a sequence of utterances of a human user;

instructions stored in memory and a processor in communication with the memory for executing the instructions for:

predicting a first of a sequence of actions to be performed by an agent, the first action comprising a dialog act of the agent, which is limited to a predefined set of dialog acts or types of dialog act, comprising:

receiving an agent input comprising a value for each of a predefined set of agent-specific variables to be instantiated with values;

for each hop, computing an updated controller state comprising:
- applying a gate mechanism to an input controller state to generate first and second gate transforms, wherein for a first of the sequence of hops, the input controller state is generated from the agent input and for a subsequent hop, the input controller state is the updated controller state of the preceding hop,
- computing an output of the supporting memories based on the input controller state,
- combining an elementwise product of the output of the supporting memories and first gate transform with an elementwise product of the input controller state and the second gate transform to generate the updated controller state;

predicting the first action based on the updated controller state of a terminal one of the hops, and updating the values of the agent input;

predicting at least a second of the sequence of actions to be performed by the agent, the second action comprising a dialog act of the agent, comprising:
- repeating the computing of an updated controller state for each hop, wherein for a first of the sequence of hops, the input controller state is generated from a previously generated updated agent input; and
- predicting the second action based on the updated controller state of a terminal one of the hops.

* * * * *